US006302074B1

(12) United States Patent
Bolsover et al.

(10) Patent No.: US 6,302,074 B1
(45) Date of Patent: Oct. 16, 2001

(54) INTAKE MANIFOLD AND VALVE COVER MODULE

(75) Inventors: Graham Bolsover, Kingsville (CA); Stephen E. Brackett, Clarkston, MI (US)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/689,107

(22) Filed: Oct. 12, 2000

Related U.S. Application Data

(60) Provisional application No. 60/158,918, filed on Oct. 12, 1999.

(51) Int. Cl.$^{7}$ .......................... F16M 1/026; F02M 35/104

(52) U.S. Cl. .................................... 123/90.38; 123/195 C; 123/184.21

(58) Field of Search .............................. 123/90.38, 195 C, 123/198 E, 184.21

(56) References Cited

U.S. PATENT DOCUMENTS 2,724,378 11/1955 Wellman .
3,941,115 3/1976 Tshida et al. ..................... 123/90.38
4,509,567 4/1985 Harrison et al. ....................... 141/97
4,788,950 * 12/1988 Finley .............................. 123/195 C
5,095,860 * 3/1992 Newell .............................. 123/90.38
5,575,247 * 11/1996 Nakayama et al. ............. 123/184.21
6,092,498 * 7/2000 Lohr et al. ......................... 123/90.38

FOREIGN PATENT DOCUMENTS 4003282 8/1991 (DE) .
9518352 11/1996 (DE) .
0307571 3/1989 (EP) .

* cited by examiner

*Primary Examiner*—Weilun Lo

(57) ABSTRACT

An intake manifold assembly and a valve cover is pivotally supported by the intake manifold assembly for rotational movement relative thereto. Preferably, a hinge assembly pivotally supports and connects the valve cover to the intake manifold assembly. During assembly of the engine, the intake manifold assembly is secured to a portion of a base engine assembly such as the cylinder head. Specifically, threaded fasteners may secure a flange of the intake manifold assembly which is adjacent to the hinge assembly to the cylinder head. The valve cover is rotated relative to the intake manifold assembly and into engagement with the cylinder head so that a valve cover gasket sealingly engages the cylinder head. Fasteners on a side of the valve cover opposite the hinge assembly secure the valve cover to the cylinder head. Fasteners are not needed on the side of the valve cover that is adjacent to the hinge assembly since the fasteners along the intake manifold assembly flange retain the side of the valve cover assembly adjacent to the hinge assembly into engagement with the cylinder head.

19 Claims, 2 Drawing Sheets

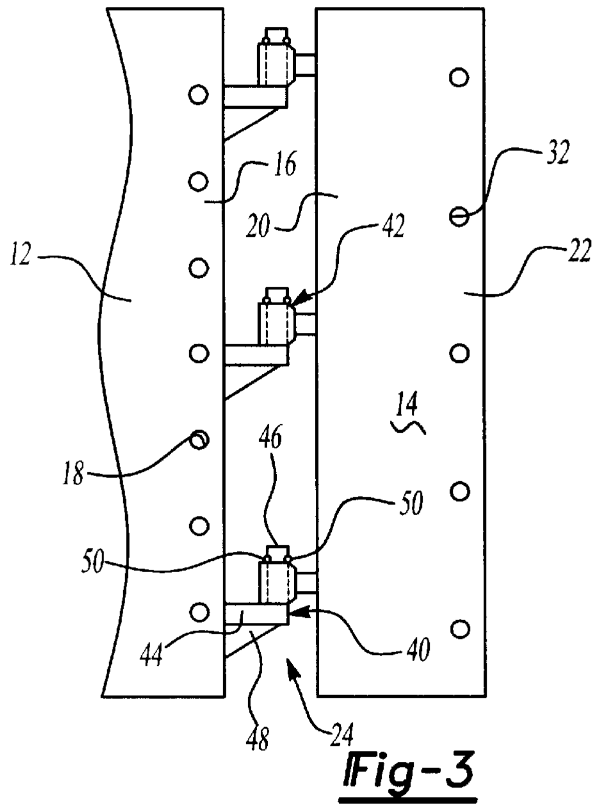
Fig-3
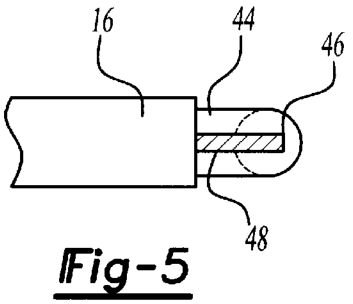
Fig-5
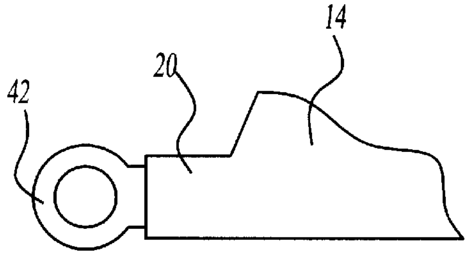
Fig-6
Fig-4
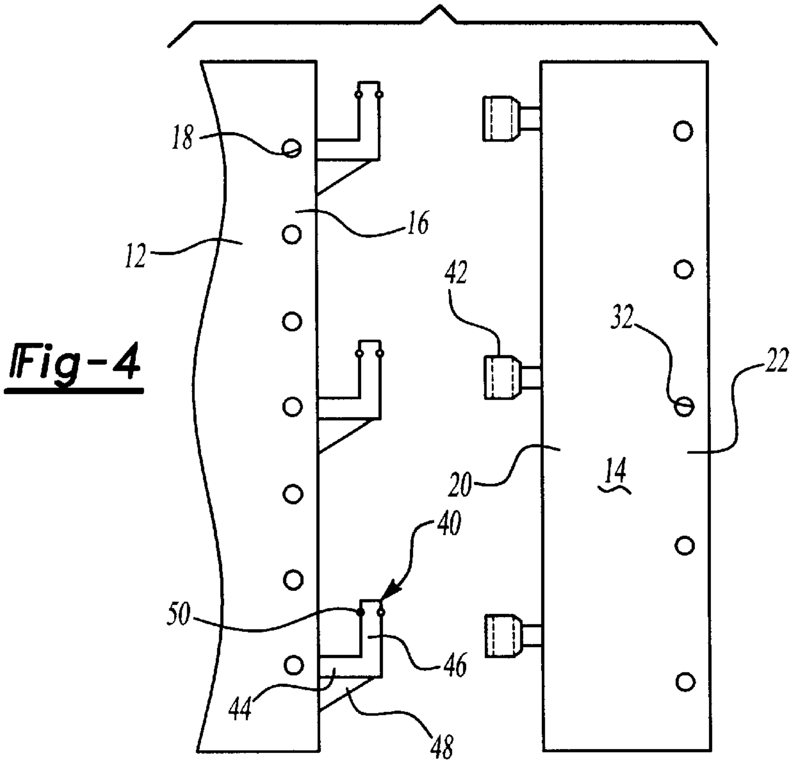

INTAKE MANIFOLD AND VALVE COVER MODULE

This application claims priority from provisional application serial No. 60/158,918, filed Oct. 12, 1999.

BACKGROUND OF THE INVENTION

This invention relates to an intake manifold and a valve cover preferably for an internal combustion engine, and more particularly, the invention relates to an intake manifold and valve cover module to be installed as a unit onto an engine.

An engine includes an intake manifold for delivering air from the atmosphere to the combustion chambers. Many intake manifold assemblies include fuel injectors and various valves and accessories as a module for ease of shipping and assembly of the intake manifold assembly onto the base engine assembly. The intake manifold assembly is typically installed onto an engine block and cylinder heads of the base engine assembly by threaded fasteners. Engines also include valve covers that are secured to the cylinder head by fasteners typically around the entire perimeter of the valve cover to enclose the rocker arms and intake and exhaust valves to prevent debris from entering the cylinder head and inhibiting its operation. The intake manifold assemblies and valve covers of the prior art are shipped separately and installed separately onto the base engine using many fasteners. It is desirable to provide engine assembly plants with preassembled modules to simplify the assembly of the engine. It is also desirable to use a minimal number of fasteners to speed assembly of the engine and reduce cost. Therefore, what is needed is an intake manifold assembly and valve cover module for installation onto a base engine assembly which may be shipped as a unit and installed onto the base engine assembly using a reduced number of fasteners.

SUMMARY OF THE INVENTION AND ADVANTAGES

The present invention provides an intake manifold assembly and a valve cover pivotally supported by the intake manifold assembly for rotational movement relative thereto. Preferably, a hinge assembly pivotally supports and connects the valve cover to the intake manifold assembly. During assembly of the engine, the intake manifold assembly is secured to a portion of a base engine assembly such the cylinder head. Specifically, threaded fasteners may secure a flange of the intake manifold assembly which is adjacent to the hinge assembly to the cylinder head. The valve cover is rotated relative to the intake manifold assembly and into engagement with the cylinder head so that a valve cover gasket sealingly engages the cylinder head. Fasteners on a side of the valve cover opposite the hinge assembly secure the valve cover to the cylinder head. Fasteners are not needed on the side of the valve cover that is adjacent to the hinge assembly, as required by the prior art, since the fasteners along the intake manifold assembly flange retain the side of the valve cover assembly adjacent to the hinge assembly into engagement with the cylinder head.

Accordingly, the present invention provides an intake manifold assembly and valve cover module that may be shipped as a unit and which requires a reduced number of fasteners to install onto the base engine assembly.

BRIEF DESCRIPTION OF THE DRAWINGS

Other advantages of the present invention can be understood by reference to the following detailed description when considered in connection with the accompanying drawings wherein:

FIG. 3 is a top elevational view of a hinge assembly of the present invention;

FIG. 4 is a top elevational view of the valve cover detached from the intake manifold assembly;

FIG. 5 is a side elevational view of a male member of the hinge assembly; and FIG. 6 is a side elevational view of a female member of the hinge assembly.

DETAILED DESCRIPTION OF THE PREFERRED EMBODIMENT

Figure 1:
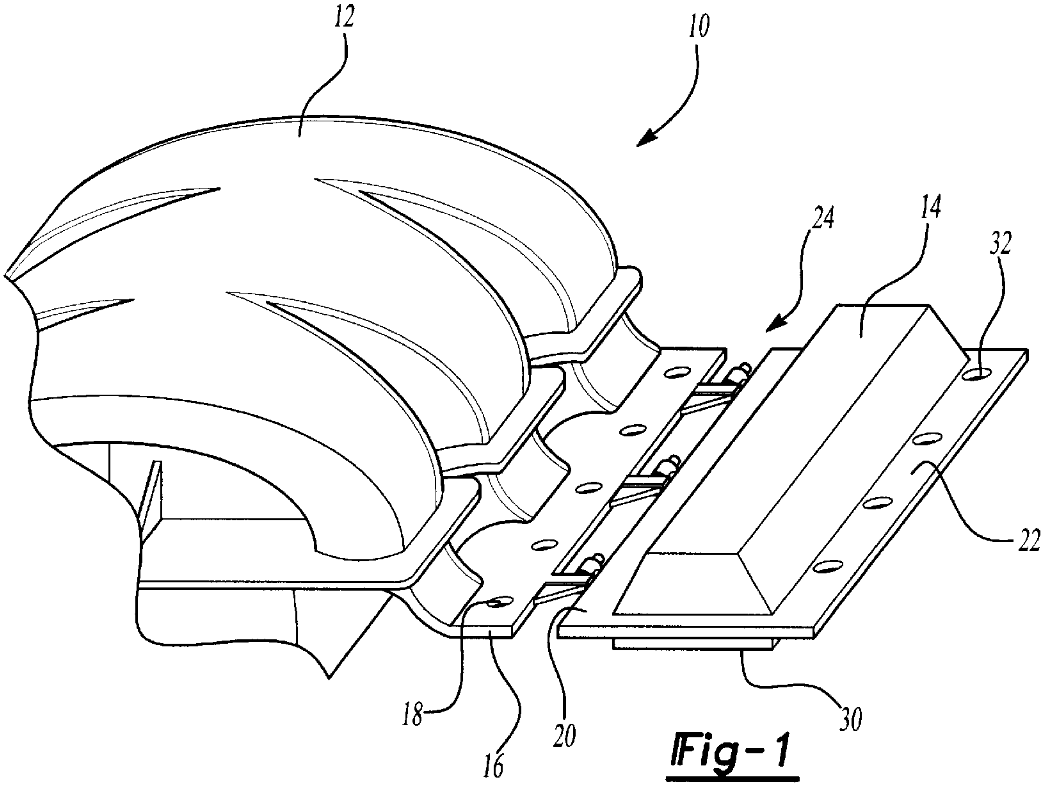
FIG. 1 is a perspective view of the intake manifold assembly and valve cover module of the present invention.
Figure 2:
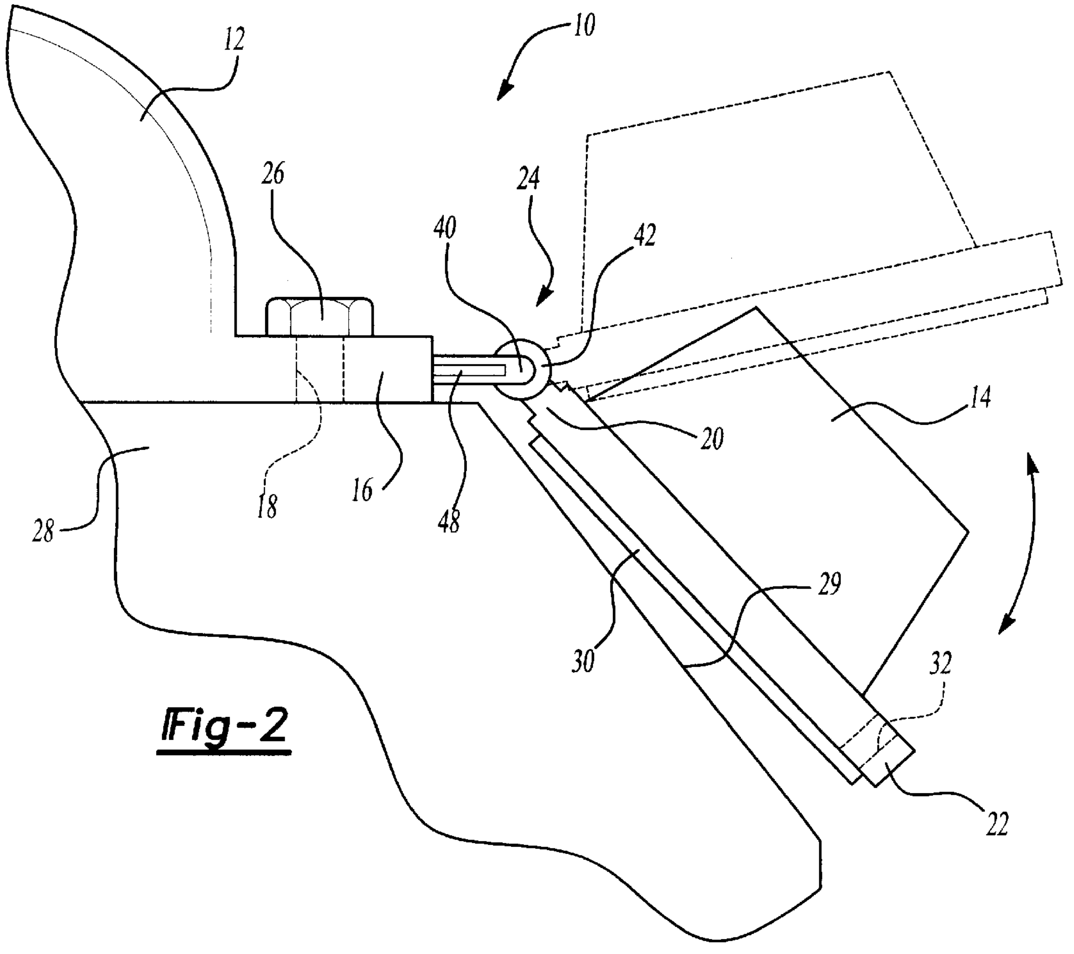
FIG. 2 is a side elevational view of the present invention module installed onto a cylinder head of a base engine assembly.

An intake manifold and valve cover module 10 of the present invention is shown in FIGS. 1 and 2. The module 10 includes an intake manifold assembly 12 and a valve cover 14. Preferably, the intake manifold assembly 12 and the valve cover 14 are molded from a plastic. The intake manifold assembly 12 may include fuel injectors, valves, and other accessories to provide an integrated unit to simplify assembly. The intake manifold assembly 12 has a flange 16 arranged about at least a portion of the perimeter of the intake manifold assembly 12. The flange 16 includes a plurality of apertures 18 for receiving threaded fasteners that secure the intake manifold assembly 12 to the base engine assembly, such as the engine block and/or cylinder head.

To further improve the modular design of the present invention an oil separator may be molded as part of the valve cover. Additionally, the PCV valve may be integrated into the valve cover to further reduce the number of components that must be assembled onto the base engine. The intake manifold assembly 12 may also include a central cavity that is in connection with the EGR valve, the PCV valve and the canister purge system. Moreover, a damping material may be molded into the valve cover 14 to reduce valve train noise. Preferably, the intake manifold assembly 12 and the valve cover 14 are molded from a plastic.

The valve cover 14 has a side 20 adjacent to a portion of the flange 16 and an opposing side 22 opposite the side 20. The valve cover 14 is pivotally supported by the intake manifold assembly 12 for rotational movement relative thereto. The valve cover 14 is rotatable between a shipping position in which the valve cover is up (shown in FIG. 1) and an assembly position in which the valve cover 14 is down (shown in FIG. 2). Preferably, the module 10 includes a hinge assembly 24 for pivotally supporting a connecting the valve cover 14 to the intake manifold assembly 12.

The intake manifold assembly 12 is secured to the cylinder head 28 by fasteners 26. Once the intake manifold assembly 12 has been installed, the valve cover 14 is rotated into engagement with the cylinder head 28. The valve cover 14 includes a gasket 30 that engages a sealing surface 29 of the cylinder head 28. As the valve cover 14 is rotated into engagement with the cylinder head 28, the side of the gasket 30 which is on side 20 of the valve cover 14 engages a sealing surface 29. Fasteners (not shown) are received in the apertures 32 on the opposing side 22 to fully secure the valve cover 14 to the cylinder head 28. Together, the fasteners 26 that secure the flange 16 of the intake manifold assembly 12 to the cylinder head 28 and the fasteners on the opposing side 22 of the valve cover 14 ensure that the gasket 30 is in sealing engagement with the sealing surface 29 about the entire perimeter of the cylinder head 28. In this manner, fasteners used in the prior art on side 20 of the valve cover 14 may be eliminated.

The hinge assembly 24 is shown in more detail in FIGS. 3–6. The valve cover 14 may be constructed separately from the intake manifold assembly 12 and then removably secured to the intake manifold assembly 12 for shipment The hinge assembly 24 may include interlocking male 40 and female 42 members. The male member 40 may be of an L-shaped configuration and include a first leg 44 extending from the flange 16. A second leg 46 may extend in a transverse direction to the first leg 44 and parallel to the flange 16. It is to be understood that the male member may be located on the valve cover 14 instead of the intake manifold assembly 12. The male member 40 may also include a reinforcing rib 48 extending between the second leg 46 and the flange 16 to prevent breakage of the male member 40 from the intake manifold assembly 12. The second leg 46 may include protrusions 50 that retain the female member 42 onto the male member 40. That is, the female member 42 is snap fit onto the male member 40. It is to be understood that the hinge assembly 24 may be of any suitable configuration. The male 40 and female 42 members are shown in more detail in FIGS. 5 and 6.

It is also to be understood that in one aspect of the present invention, the side 20 of the cover 14 may be clamped under the flange 26 into engagement with the cylinder head 28. Although it is preferable that the valve cover 14 be pivotally supported to the intake manifold assembly 12 by the hinge assembly 24 to provide a convenient module for shipping, the side 20 of the valve cover 14 may be retained against the sealing surface 29 of the cylinder head 28 by the flange 16. That is, the flange 16 may extend to clamp the side 20 against the sealing surface 29. Said another way, in one aspect of the present invention the hinge assembly 24 is now required to secure the valve cover 14 to the cylinder head 28. However, it is preferable that the valve cover 14 be secured to the intake manifold assembly 12 by a hinge assembly 24 so that the intake manifold assembly 12 and valve cover 14 may be shipped as a module or unit.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A module for an internal combustion engine comprising:

an intake manifold assembly; and a valve cover pivotally supported by said intake manifold assembly for rotational movement relative thereto.

2. The module according to claim 1, further including a hinge assembly pivotally supporting and connecting said valve cover to said intake manifold assembly.

3. The module according to claim 2, wherein said hinge assembly includes a male member extending from one of said intake manifold assembly and said valve cover and a female member pivotally receiving said male member and extending from the other of said intake manifold assembly and said valve cover.

4. The module according to claim 3, wherein said members are retained together by a snap-fit.

5. The module according to claim 3, wherein said male member is L-shaped with a first leg extending from one of said intake manifold assembly and said valve cover and a second leg extending from said first leg, said second leg received by said female member.

6. The module according to claim 5, wherein said male member includes a reinforcing rib connecting said first leg and said one of said intake manifold assembly and said valve cover.

7. The module according to claim 4, wherein said male member includes a protrusion for retaining said female member on said male member.

8. The module according to claim 2, wherein said intake manifold assembly includes a plurality of fastener apertures adjacent to said hinge assembly for receiving fasteners to secure the intake manifold assembly to a base engine assembly, and said valve cover includes a plurality of fastener apertures on a side opposite said hinge assembly for receiving fasteners to secure the valve cover assembly to the base engine assembly and no fastener apertures on a side of said valve cover adjacent said hinge assembly.

9. An internal combustion engine comprising:

a base engine assembly including a cylinder head and a portion;

an intake manifold assembly secured to said portion; and a valve cover having a side retained by and pivotable relative to said intake manifold assembly and an opposing side secured to said cylinder head.

10. The engine according to claim 9, wherein said intake manifold and said valve cover are secured to said portion and said cylinder head, respectively, by threaded fasteners.

11. The engine according to claim 10, further including a hinge assembly pivotally connecting said valve cover to said intake manifold assembly forcing said side of said valve cover into engagement with said cylinder head.

12. The engine according to claim 11, wherein said hinge assembly includes interlocking male and female members.

13. The engine according to claim 9, wherein said cylinder head includes said portion.

14. A method for installing a module onto a base engine assembly comprising the steps of:

a) securing an intake manifold assembly to a base engine portion;

b) retaining a side of a valve cover with the intake manifold assembly;

c) pivoting the valve cover into engagement with a cylinder head; and d) securing the valve cover to the cylinder head.

15. The method according to claim 14, wherein the cylinder head includes the base engine portion.

16. The method according to claim 14, wherein step a) includes securing a flange of the intake manifold assembly to the base engine portion with the flange being adjacent to the side of the valve cover.

17. The method according to claim 16, wherein step b) includes pivotally connecting the valve cover to the intake manifold assembly.

18. The method according to claim 14, wherein step c) includes c1) engaging the cylinder head with a valve cover gasket on the side of the valve cover and c2) engaging the cylinder head with the valve cover gasket on an opposing side of the valve cover.

19. The method according to claim 18, wherein step d) includes fastening the opposing side of the valve cover to the cylinder head.

* * * * *